United States Patent Office 3,291,807
Patented Dec. 13, 1966

3,291,807
PROCESS FOR PRODUCTION OF 5-(INDOL-3-YL)-2-PYRROLIDINONES
Jackson B. Hester, Jr., Portage, Mich., assignor to The Upjohn Company, Kalamazoo, Mich., a corporation of Delaware
No Drawing. Filed May 11, 1964, Ser. No. 366,647
3 Claims. (Cl. 260—326.13)

This invention pertains to novel indole derivatives and to a novel process. More particularly, the invention pertains to novel 5-(indol-3-yl)-2-pyrrolidinones and to a novel process for the preparation thereof.

The novel 5-(indol-3-yl)-2-pyrrolidinones are represented by the formula:

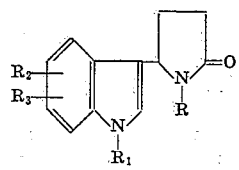

I wherein R is selected from the group consisting of alkyl of one to four carbon atoms, inclusive, and benzyl; $R_1$ is selected from the group consisting of hydrogen, alkyl of one to four carbon atoms, inclusive, and benzyl; and $R_2$ and $R_3$ are selected from the group consisting of hydrogen, alkyl of one to four carbon atoms, inclusive, alkoxy of one to four carbon atoms, inclusive, and halogen.

Examples of alkyl of one to four carbon atoms, inclusive, are methyl, ethyl, propyl, isopropyl, butyl, sec. butyl, and the like. Examples of alkoxy of one to four carbon atoms, inclusive, are methoxy, ethoxy, propoxy, isopropoxy, butoxy, sec. butoxy, and the like. Examples of halogen are fluorine, chlorine, bromine, and iodine.

The novel compounds of Formula I can be prepared by the following reaction sequence:

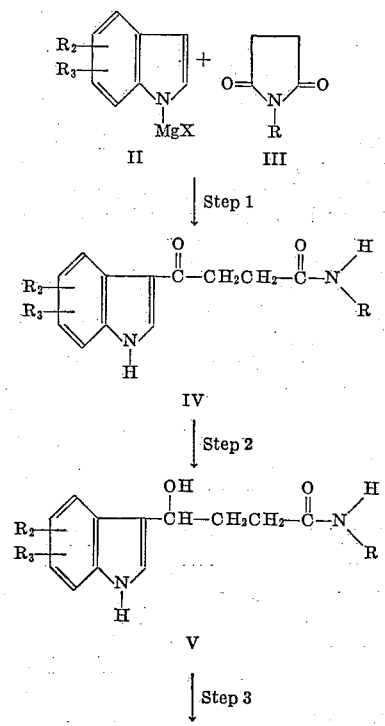

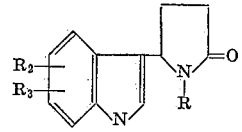

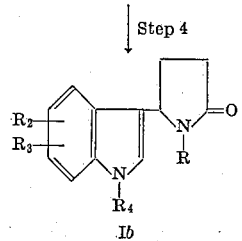

In the foregoing formulas, R, $R_2$ and $R_3$ are as given above $R_4$ is alkyl of one to four carbon atoms, inclusive, and benzyl; and X is halogen having an atomic number from 17 to 53, inclusive, i.e., X is chlorine, bromine, or iodine, preferably bromine or iodine.

The indolyl Grignard reagents of Formula II are prepared in a conventional manner, for example, by reacting an indole of the formula:

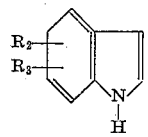

VI wherein $R_2$ and $R_3$ are as given above, with an ethereal solution of an alkyl Grignard reagent such as methylmagnesium bromide, methylmagnesium iodide, ethylmagnesium iodide, propylmagnesium iodide, butylmagnesium chloride, isobutylmagnesium bromide, and the like.

Indoles of Formula VI can be prepared by known procedures. Such methods, including the well-known Fischer synthesis, are summarized in "Chemistry of Carbon Compounds," E. H. Rodd, editor, vol. IVA, pages 71–77, Elsevier, New York, 1957; and Heterocyclic Compounds, Elderfield, vol. 3, 1952, John Wiley and Sons, Inc.; also see U.S. Patent 2,870,162. Representative starting indoles include indole, 4-methylindole, 5-methylindole, 6 - methylindole, 7 - methylindole, 4,6-dimethylindole, 5,6-dimethylindole, 5,7-dimethylindole, 6,7 - dimethylindole, 5-ethylindole, 7 - ethylindole, 4,6-diethylindole, 4,5 - dipropylindole, 4-methyl-7-isopropylindole, 6-butylindole, 5-isobutylindole, 4-chloroindole, 5-chloroindole, 6-chloroindole, 7-chloroindole, 4,6-dichloroindole, 4,7-dichloroindole, 5,7-dichloroindole, 4-bromoindole, 5-bromoindole, 7 - bromoindole, 5 - fluoroindole, 6-fluoroindole, 7-fluoroindole, 4 - iodoindole, 5 - iodoindole, 5-chloro-6-methoxyindole, 4 - methoxy-indole, 5-methoxyindole, 6-methoxyindole, 7-methoxyindole, 4,7-dimethoxyindole, 4,5-dimethoxyindole, 5,6-dimethoxyindole, 6,7-dimethoxyindole, 5-ethoxyindole, 6 - ethoxyindole, 5,6-diethoxyindole, 5-propoxyindole, 6-butoxyindole, and the like.

The N-benzyl- and N-alkylsuccinimides of Formula III can be prepared by known procedures, for example, by heating primary amine salts of succinic acid. See Bellack et al., J. Agr. Food Chem. 2, 1176 (1954). Representative N - substituted succinimides include N-benzylsuccinimide, N-methylsuccinimide, N-ethylsuccinimide, N- propylsuccinimide, N-isopropylsuccinimide, N-butylsuccinimide, N-sec. butylsuccinimide, and the like.

The N-benzyl- and N-alkyl-γ-oxoindole-3-butyramides of Formula IV can be prepared in accordance with Step 1 of the above reaction sequence. An indolyl Grignard reagent of Formula II is mixed with an N-substituted succinimide of Formula III, advantageously under substantially anhydrous conditions and in the presence of an inert liquid medium such as diethyl ether, diisopropyl ether, benzene, toluene, and the like, or mixtures thereof. It is preferred to employ about two molecular equivalents of indolyl Grignard reagent for each molecular equivalent of N-substituted succinimide, although a somewhat larger or smaller amount of either reactant can be employed if desired. The reaction can be carried out between about 20° and about 50° C., or even somewhat higher or lower. The time required for completing the reaction will vary depending on the particular conditions such as reaction temperature, the particular reactants being employed, concentration of the reactants, etc., but seldom will exceed about 24 hours. When the reaction has been completed, the resulting N-substituted-γ-oxoindole-3-butyramide is recovered in conventional manner, for example, by pouring the reaction mixture into water and separating the product, and then purified if so desired, for example, by recrystallization.

Alternatively, the N-substituted-γ-oxoindole-3-butyramides of Formula IV can be prepared by the process disclosed by Ballantine et al., J. Chem. Soc. 2292 (1960) for the preparation of N-methyl-γ-oxoindole-3-butyramide.

The N-benzyl- and N-alkyl-γ-hydroxyindole-3-butyramides of Formula V are prepared by reducing the N-benzyl- and N-alkyl-γ-oxoindole-3-butyramides of Formula IV. The reduction can be carried out by catalytic hydrogenation in the presence of a catalyst such as Raney nickel, platinum, and the like, and an inert liquid medium such as methanol, ethanol, acetic acid, and the like. Preferably, however, the reduction is carried out with a metal hydroxide such as sodium borohydride, lithium borohydride, and the like. The preferred reducing agent is sodium borohydride.

In a preferred embodiment of the foregoing reduction, sodium borohydride and an N-substituted-γ-oxoindole-3-butyramide of Formula IV are mixed in the presence of an inert liquid medium such as water, methanol, ethanol, isopropyl alcohol, and the like, or mixtures thereof. The reactants can be employed in substantially equimolecular proportions, although it is preferred to employ a somewhat larger proportion of sodium borohydride, such as up to about seven or even somewhat more molecular equivalents of sodium borohydride for each molecular equivalent of N-substituted-γ-oxoindole-3-butyramide. The reaction can be carried out between about 20° and about 40° C., or even somewhat higher or lower. The time required for completing the reaction will vary depending on the particular conditions such as those mentioned above in connection with Step 1, but seldom will exceed about 24 hours. When the reaction has been completed, the resulting N-substituted-γ-hydroxyindole-3-butyramide is recovered in conventional manner, for example, by salting out from an aqueous solution, and purified if so desired, for example, by recrystallization.

The 5-(indol-3-yl)-2-pyrrolidinones of Formula Ia (compounds of Formula I in which $R_1$ is hydrogen) are prepared by concomitantly dehydrating and cyclizing the N-benzyl- and N-alkyl-γ-hydroxyindole-3-butyramides of Formula V. Preferably, the reaction is carried out in the presence of an inert liquid medium which forms an azeotrope with water, for example, benzene, toluene, and the like, and a small amount of an acid catalyst such as oxalic acid, p-toluenesulfonic acid, and the like, for example, from about 0.01 to about 0.05 molecular equivalent of acid catalyst for each molecular equivalent of N-substituted-γ-hydroxyindole-3-butyramide. The reaction can be carried out between about 65° and about 150° C. In many instances, e.g., when employing benzene or toluene, it is advantageous to carry out the reaction at the reflux temperature of the mixture while azeotropically removing water formed during the reaction. The resulting 5-(indol-3-yl)-2-pyrrolidinone is recovered in conventional manner, for example, by evaporating the reaction mixture to dryness, followed by chromatography and recrystallization.

The 5-(indol-3-yl)-2-pyrrolidinones of Formula Ib (compounds of Formula I in which $R_1$ is alkyl or benzyl) are prepared from the 5-(indol-3-yl)-2-pyrrolidinones of Formula Ia (compounds of Formula I in which $R_1$ is hydrogen) in accordance with known procedures for converting 1-unsubstituted indoles to 1-alkyl and 1-benzylindoles. For example, the compound of Formula Ia can be reacted with an alkyl or benzyl halide (e.g., benzyl chloride, benzyl bromide, methyl iodide, ethyl iodide, isopropyl iodide, butyl bromide, and the like) in the presence of an alkaline condensing agent such as an alkali-metal amide or hydride (e.g., sodium amide, potassium amide, lithium amide, sodium hydride, and the like) and an inert liquid medium such as dimethylformamide, liquid ammonia, and the like.

The novel 5-(indol-3-yl)-2-pyrrolidinones of Formula I have antiviral activity, e.g., they inhibit the growth of Newcastle disease virus in chick embryo cells. They also have sedative activity and can be used to produce sedation in birds and animals, including humans.

The 5-(indol-3-yl)-2-pyrrolidinones of Formula I are also useful as chemical intermediates. For example, they can be reduced with lithium aluminum hydride in the presence of an inert liquid medium such as diethyl ether or tetrahydrofuran, to obtain the corresponding 3-(2-pyrrolidinyl)indoles of the formula:

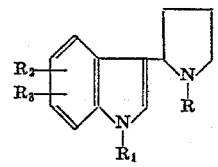

VII wherein R, $R_1$, $R_2$ and $R_3$ are as given above. The 3-(2-pyrrolidinyl)indoles of Formula VII are orally and parenterally active in birds and animals, including humans, for the treatment of neuroses, such as anxiety, tension, apprehension, or agitation, and for treatment of psychotic conditions, e.g., in schizophrenia.

In the classical avoidance test, the 3-(2-pyrrolidinyl)-indoles demonstrated the ability to relieve experimentally-induced anxiety, and in the fighting-mouse test, the 3-(2-pyrrolidinyl)indoles demonstrated the ability to minimize aggressive behavior in mice in which an aggressive behavior had been induced as a result of isolation stress.

The 3-(2-pyrrolidinyl)indoles have also demonstrated pseudocholinesterase inhibitory activity which is a valuable tool in producing selective stimulation and lucid intervals in confused mental states.

In addition, the 3-(2-pyrrolidinyl)indoles are also useful anti-anaphylactic and anti-inflammatory agents.

The following examples are illustrative of the process and products of the present invention but are not to be construed as limiting.

EXAMPLE 1

5-(indol-3-yl)-1-methyl-2-pyrrolidinone

A. N-METHYL-γ-OXOINDOLE-3-BUTYRAMIDE

To a stirred mixture of 3.55 g. (0.146 mole) of magnesium turnings and 25 ml. of anhydrous diethyl ether, under nitrogen, was added dropwise 9.08 ml. (0.146 mole) of methyl iodide. After the mixture had stood at about 25° C. for 30 minutes, a solution of 17.1 g. (0.146 mole) of indole in 25 ml. of dry benzene was added dropwise with stirring. The resulting mixture was allowed to stand at about 25° C. for one hour and then was poured into a graduated cylinder with the aid of dry benzene; total volume, 71.5 ml. A 47.6-ml. aliquot (containing 0.097 mole of indolyl magnesium iodide) was added during one hour, under nitrogen, to a stirred solution of 5.0 g. (0.044 mole) of N-methylsuccinimide in 40 ml. of dry benzene. The resulting thick suspension was stirred for 18 hours at about 25° C., and was then treated with about 30 ml. of saturated aqueous ammonium chloride solution. This mixture was poured into water and filtered. The filter cake was washed successively with diethyl ether and dilute acetic acid, dried under reduced pressure, and recrystallized first from a mixture of ethanol and ethyl acetate and then from ethanol. There was thus obtained N-methyl-γ-oxoindole-3-butyramide having a melting point of 203–204° C. (dec.).

B. N-METHYL-γ-HYDROXYINDOLE-3-BUTYRAMIDE

A mixture of N-methyl-γ-oxoindole-3-butyramide (20.0 g.; 0.087 mole), sodium borohydride (20.0 g.; 0.526 mole), and 700 ml. of anhydrous ethanol was stirred, under nitrogen, at about 25° C. for 19 hours. The resulting solution was concentrated to dryness under reduced pressure. The residue was mixed with about 500 ml. of water and the mixture was filtered; 6.84 g. of unchanged N-methyl-γ-oxoindole-3-butyramide was recovered. The filtrate was saturated with sodium chloride and the resulting white, crystalline N-methyl-γ-hydroxyindole-3-butyramide was collected by filtration; weight, 8.91 g. This last filtrate was extracted several times with diethyl ether. The combined extracts were washed with saturated sodium chloride solution, dried with anhydrous sodium sulfate, and concentrated to dryness under reduced pressure. Crystallization of the residue from a mixture of acetone and ethyl acetate yielded an additional 2.29 g. of N-methyl-γ-hydroxyindole-3-butyramide having a melting point of 101–105° C. (total yield 84.5%, allowing for recovered starting material). An analytical sample prepared by several recrystallizations from a mixture of acetone and ethyl acetate had a melting point of 102.5–104.5° C.

Analysis.—Calcd. for $C_{13}H_{16}N_2O_2$: C, 67.22; H, 6.94; N, 12.06. Found: C, 67.23; H, 6.64; N, 12.03.

C. 5-(INDOL-3-YL)-1-METHYL-2-PYRROLIDINONE

A mixture of 10.0 g. (0.043 mole) of N-methyl-γ-hydroxyindole-3-butyramide, 0.1 g. of oxalic acid, and 500 ml. of benzene was refluxed gently, under nitrogen, for one hour, water being removed azeotropically as it was formed during the reaction. Concentration of the mixture under reduced pressure yielded a gum which was dissolved in a small amount of methylene chloride and chromatographed on two pounds of neutral alumina, using chloroform as eluant. Crystallization of the resulting product from ethyl acetate yielded 5-(indol-3-yl)-2-pyrrolidinone having a melting point of 156–158.5° C. (polymorph A).

Recrystallization of the product obtained in a similar run from a mixture of ethyl acetate and Skellysolve B (mixture of hexanes) yielded 5-(indol-3-yl)-2-pyrrolidinone having a melting point of 146.5–148° C. (polymorph B). That the two products were in fact polymorphs of the same compound was shown by mixed melting point (158–159.5° C.) and infrared spectrum comparison in chloroform.

Elemental analysis of polymorph B.—
Calcd. for $C_{13}H_{14}N_2O$: C, 72.87; H, 6.59; N, 13.08. Found: C, 72.68; H, 6.36; N, 12,75.

Following the procedure of Example 1, Part A, but replacing N-methylsuccinimide with N-ethylsuccinimide, N-isopropylsuccinimide, N-butylsuccinimide, and N-benzylsuccinimide, there are obtained N-ethyl-γ-oxoindole-3-butyramide, N-isopropyl-γ-oxoindole-3-butyramide, N-butyl-γ-oxoindole-3-butyramide, and N-benzyl-γ-oxoindole-3-butyramide, respectively.

Following the procedure of Example 1, Part B, but replacing N-methyl-γ-oxoindole-3-butyramide with N-ethyl-γ-oxoindole-3-butyramide, N-isopropyl-γ-oxoindole-3-butyramide, N-butyl-γ-oxoindole-3-butyramide, and N-benzyl-γ-oxoindole-3-butyramide, there are obtained N-ethyl-γ-hydroxyindole - 3 - butyramide, N-isopropyl-γ-hydroxyindole - 3 - butyramide, N-butyl-γ-hydroxyindole-3-butyramide, and N-benzyl-γ-hydroxyindole-3-butyramide, respectively.

Following the procedure of Example 1, Part C, but replacing N-methyl-γ-hydroxyindole-3-butyramide with N-ethyl-γ-hydroxyindole-3-butyramide, N-isopropyl-γ-hydroxyindole - 3 - butyramide, N-butyl-γ-hydroxyindole-3-butyramide, and N-benzyl-γ-hydroxyindole-3-butyramide, there are obtained 5-(indol-3-yl)-1-ethyl-2-pyrrolidinone, 5-(indol-3-yl)-1-isopropyl - 2 - pyrrolidinone, 5-(indol-3-yl)-1-butyl-2-pyrrolidinone, and 5-(indol - 3 - yl)-1-benzyl-2-pyrrolidinone, respectively.

EXAMPLE 2

5-(7-methylindol-3-yl)-1-methyl-2-pyrrolidinone

Following the procedure of Example 1, Parts A, B and C, but replacing the indole of Part A with 7-methylindole, there was obtained 5-(7-methylindol-3-yl)-1-methyl-2-pyrrolidinone.

EXAMPLE 3

5-(5-isobutylindol-3-yl)-1-methyl-2-pyrrolidinone

Following the procedure of Example 1, Parts A, B and C, but replacing the indole of Part A with 5-isobutylindole, there was obtained 5-(5-isobutylindol-3-yl)-1-methyl-2-pyrrolidinone.

EXAMPLE 4

5-(7-isopropyl-4-methylindol-3-yl)-1-methyl-2-pyrrolidinone

Following the procedure of Example 1, Parts A, B and C, but replacing the indole of Part A with 7-isopropyl-4-methylindole, there was obtained 5-(7-isopropyl-4-methylindol-3-yl)-1-methyl-2-pyrrolidinone.

EXAMPLE 5

5-(6-chloroindol-3-yl)-1-methyl-2-pyrrolidinone

Following the procedure of Example 1, Parts A, B and C, but replacing the indole of Part A with 6-chloroindole, there was obtained 5-(6-chloroindol-3-yl)-1-methyl-2-pyrrolidinone.

EXAMPLE 6

5-(4-bromoindol-2-yl)-1-methyl-2-pyrrolidinone

Following the procedure of Example 1, Parts A, B and C, but replacing the indole of Part A with 4-bromoindole, there was obtained 5-(4-bromoindol-3-yl)-1-methyl-2-pyrrolidinone.

EXAMPLE 7

5-(6-fluoroindol-3-yl)-1-methyl-2-pyrrolidinone

Following the procedure of Example 1, Parts A, B and C, but replacing the indole of Part A with 6-fluoroindole, there was obtained 5-(6-fluoroindol-3-yl)-1-methyl-2-pyrrolidinone.

EXAMPLE 8

5-(4-methoxyindol-3-yl)-1-methyl-2-pyrrolidinone

Following the procedure of Example 1, Parts A, B and C, but replacing the indole of Part A with 4-methoxyindole, there was obtained 5-(4-methoxyindol-3-yl)-1-methyl-2-pyrrolidinone.

EXAMPLE 9

5-(5-ethoxyindol-3-yl)-1-methyl-2-pyrrolidinone

Following the procedure of Example 1, Parts A, B and C, but replacing the indole of Part A with 5-ethoxyindole, there was obtained 5-(5-ethoxyindol-3-yl)-1-methyl-2-pyrrolidinone.

EXAMPLE 10

5-(6-butoxyindol-3-yl)-1-methyl-2-pyrrolidinone

Following the procedure of Example 1, Parts A, B and C, but replacing the indole of Part A with 6-butoxyindole, there was obtained 5-(6-butoxyindol-3-yl)-1-methyl-2-pyrrolidinone.

EXAMPLE 11

5-(4,5-dipropylindol-3-yl)-1-propyl-2-pyrrolidinone

Following the procedure of Example 1, Parts A, B and C, but replacing indole with 4,5-dipropylindole and N-methyl-succinimide with N-propylsuccinimide in Part A, there was obtained 5-(4,5-dipropylindol-3-yl)-1-propyl-2-pyrrolidinone.

EXAMPLE 12

5-(4,7-dichloroindol-3-yl)-1-ethyl-2-pyrrolidinone

Following the procedure of Example 1, Parts A, B and C, but replacing indole with 4,7-dichloroindole and N-methylsuccinimide with N-ethylsuccinimide in Part A, there was obtained 5-(4,7-dichloroindol-3-yl)-1-ethyl-2-pyrrolidinone.

EXAMPLE 13

5-(5-chloro-6-methoxyindol-3-yl)-1-sec.butyl-2-pyrrolidinone

Following the procedure of Example 1, Parts A, B and C, but replacing indole with 5-chloro-6-methoxyindole and N-methylsuccinimide with N-sec.butylsuccinimide in Part A, there was obtained 5-(5-chloro-6-methoxyindol-3-yl)-1-sec.butyl-2-pyrrolidinone.

EXAMPLE 14

5-(5,6-dimethoxyindol-3-yl)-1-benzyl-2-pyrrolidinone

Following the procedure of Example 1, Parts A, B and C, but replacing indole with 5,6-dimethoxyindole and N-methylsuccinimide with N-benzylsuccinimide in Part A, there was obtained 5-(5,6-dimethoxyindol-3-yl)-1-benzyl-2-pyrrolidinone.

EXAMPLE 15

5-(5-ethylindol-3-yl)-1-isopropyl-2-pyrrolidinone

Following the procedure of Example 1, Parts A, B and C, but replacing indole with 5-ethylindole and N-methylsuccinimide with N-isopropylsuccinimide in Part A, there was obtained 5-(5-ethylindol-3-yl)-1-isopropyl-2-pyrrolidinone.

EXAMPLE 16

5-(1-methylindol-3-yl)-1-methyl-2-pyrrolidinone

To a stirred solution of 3.93 g. (12.5 millimoles) of 5-(indol-3-yl)-1-methyl-2-pyrrolidinone in 150 ml. of dimethylformamide was added 600 mg. of 53.2% mineral oil suspension of sodium hydride (13.3 millimoles of sodium hydride). After 1.5 hours, methyl iodide (0.83 ml.; 13.3 millimoles) was added to the mixture, which was then allowed to stand at about 25° C. for two hours and poured into 500 ml. of water. The mixture was saturated with sodium chloride and extracted with diethyl ether. The extract was washed with saturated sodium chloride solution, dried, and concentrated to dryness. There was thus obtained 5-(1-methylindol-3-yl)-1-methyl-2-pyrrolidinone.

Following the procedure of Example 16, but replacing methyl iodide with sec. butyl iodide and benzyl bromide, there are obtained 5-(1-sec.butylindol-3-yl)-1-methyl-2-pyrrolidinone and 5-(1-benzylindol-3-yl)-1-methyl-2-pyrrolidinone, respectively.

Following the procedure of Example 16, but replacing 5-(indol-3-yl)-1-methyl-2-pyrrolidinone with 5-(7-methylindol-3-yl)-1-methyl-2-pyrrolidinone, 5(1,7-dimethylindol-3-yl)-1-methyl-2-pyrrolidinone is obtained.

Following the procedure of Example 16, but substituting for 5-(indol-3-yl)-1-methyl-2-pyrrolidinone and methyl iodide the following pairs of reactants: 5-(6-fluoroindol-3-yl)-1-methyl-2-pyrrolidinone and isopropyl iodide; 5-(5,6-dimethoxyindol-3-yl)-1-benzyl-2-pyrrolidinone and ethyl iodide; 5-(7-isopropyl-4-methylindol-3-yl)-1-methyl-2-pyrrolidinone and butyl bromide; and 5-(5-chloro-6-methoxyindol-3-yl)-1-sec.butyl-2-pyrrolidinone and sec-butyl iodide, there are obtained 5-(6-fluoro-1-isopropylindol-3-yl) - 1 - methyl-2-pyrrolidinone, 5-(5,6-dimethoxy-1-ethylindol-3-yl)-1-benzyl-2-pyrrolidinone, 5(1 - butyl-7-isopropyl-4-methylindol-3-yl)-1-methyl-2-pyrrolidinone, and 5-(1 - sec.butyl - 5-chloro-6-methoxyindol-3-yl)-1-sec.butyl-2-pyrrolidinone, respectively.

I claim:
1. A process for preparing a compound of the formula:

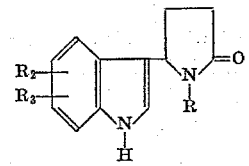

wherein R is selected from the group consisting of alkyl and benzyl, and $R_2$ and $R_3$ are selected from the group consisting of hydrogen, alkyl, alkoxy, and halogen, which comprises the steps: (1) reacting an indolyl Grignard reagent of the formula:

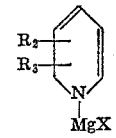

wherein $R_2$ and $R_3$ are as given above and X is halogen having an atomic number from 17 to 53, inclusive, with an N-substituted succinimide of the formula:

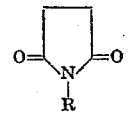

wherein R is selected from the group consisting of alkyl and benzyl; (2) reducing by catalytic hydrogenation or with an alkali-metal hydride the resulting N-substituted-γ-oxoindole-3-butyramide of the formula:

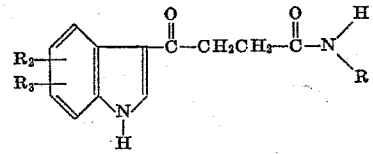

wherein R, $R_2$ and $R_3$ are as given above; and (3) concomitantly dehydrating and cyclizing the resulting N-substituted-γ-hydroxyindole-3-butyramide of the formula:

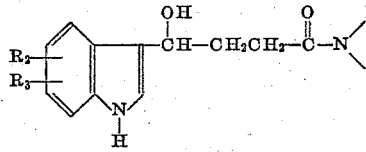

wherein R, $R_2$ and $R_3$ are as given above.

2. A process for preparing a compound of the formula:

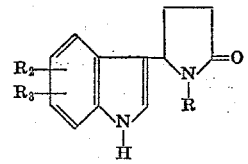

wherein R is selected from the group consisting of alkyl and benzyl, and $R_2$ and $R_3$ are selected from the group consisting of hydrogen, alkyl, alkoxy and halogen, which comprises the steps: (1) reducing by catalytic hydrogenation or with an alkali-metal hydride an N-substituted-γ-oxoindole-3-butyramide of the formula:

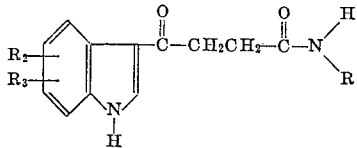

wherein R, $R_2$ and $R_3$ are as given above, to obtain an N-substituted-γ-hydroxyindole-3-butyramide of the formula:

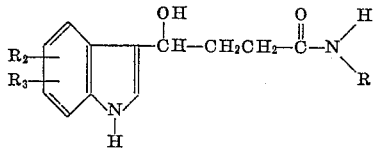

wherein R, $R_2$ and $R_3$ are as given above; and (2) concomitantly dehydrating and cyclizing the latter compound.

3. A process for preparing a compound of the formula:

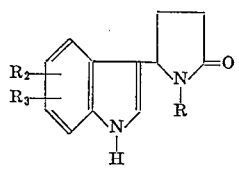

wherein R is selected from the group consisting of alkyl and benzyl, and $R_2$ and $R_3$ are selected from the group consisting of hydrogen, alkyl, alkoxy, and halogen, which comprises the step of concomitantly dehydrating and cyclizing in the presence of an inert liquid medium capable of forming an azeotrope with water and an acid catalyst a compound of the formula:

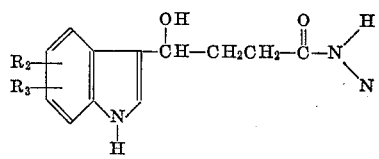

wherein R, $R_2$ and $R_3$ are as given above.

References Cited by the Examiner

UNITED STATES PATENTS 2,946,805  7/1960  Kleinschmidt et al. __ 260—326.5

FOREIGN PATENTS 119,189  4/1959  U.S.S.R.

OTHER REFERENCES

Chemical Abstracts I, vol. 60, June 1964, pp. 14601–14602.

Chemical Abstracts II, vol. 58, 1963, p. 12500a.

Cram et al.: Organic Chemistry, McGraw-Hill Book Co., Inc., New York, 1959, pages 279–280.

Mamaev et al.: Izo. Sibirsk. Otd. Akad. Nauk., 1963(3), pp. 97–102.

Mamaev et al.: Izo. Sibirsk. Otd. Akad. Nauk., 1963(3), U.S.S.R., 1962, No. 8, pp. 72–75.

ALEX MAZEL, *Primary Examiner.*

HENRY R. JILES, NICHOLAS RIZZO, *Examiners.*

M. U. O'BRIEN, *Assistant Examiner.*

UNITED STATES PATENT OFFICE
CERTIFICATE OF CORRECTION

Patent No. 3,291,807                      December 13, 1966

Jackson B. Hester, Jr.

It is certified that error appears in the above identified patent and that said Letters Patent are hereby corrected as shown below:

Column 2, lines 5 to 10, the formula should appear as show below:

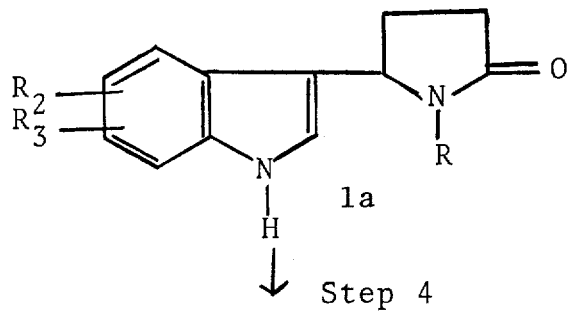

Column 3, line 40, "hydroxide" should read -- hydride --. Colum 6, line 50, "5-(4-bromoindol-2-yl)-1-methyl-2-pyrrolidinone" , italics, should read -- 5-(4-bromoindol-3-yl)-1-methyl-2-pyrrolidinone --, in italics; Column 8, lines 30 to 35, the formula should appear as shown below:

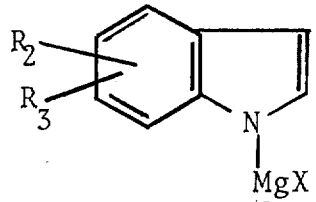

Column 10, lines 5 to 10, the formula should appear as shown below:

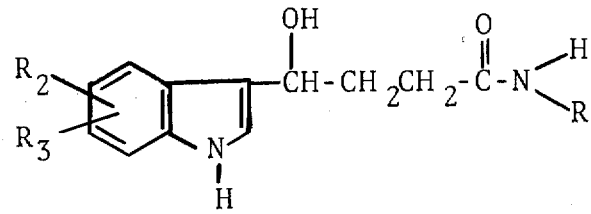

Signed and sealed this 13th day of January 1970.

(SEAL)
Attest:

EDWARD M. FLETCHER, JR.
Attesting Officer

WILLIAM E. SCHUYLER,
Commissioner of Paten